United States Patent

[11] 3,600,063

| [72] | Inventor | Thomas R. Bowen<br>3911 Shamrock Drive N.W., Huntsville, Ala. 35810 |
|---|---|---|
| [21] | Appl. No. | 819,870 |
| [22] | Filed | Apr. 28, 1969 |
| [45] | Patented | Aug. 17, 1971 |

[54] VARIFOCAL BEAM SPREADER
5 Claims, 6 Drawing Figs.

[52] U.S. Cl. .................................................. 350/167, 350/179, 350/180, 350/190
[51] Int. Cl. .................................................. G02b 27/02, G02b 1/06, G02b 3/12
[50] Field of Search .......................................... 350/167, 179, 180, 190

[56] References Cited
UNITED STATES PATENTS

| 2,018,592 | 10/1935 | Arnulf | 350/167 |
| 2,028,496 | 1/1936 | Chiti | 350/167 |
| 2,300,251 | 10/1942 | Flint | 350/180 |
| 2,303,113 | 11/1942 | Eckel | 350/190 X |
| 2,338,654 | 1/1944 | MacNeille | 350/190 |
| 2,531,399 | 11/1950 | Cawein et al. | 350/190 |
| 2,836,101 | 5/1958 | Swart | 350/180 |
| 3,371,978 | 3/1968 | Matovich | 350/180 |
| 3,484,599 | 12/1969 | Little | 350/167 UX |

OTHER REFERENCES
The Surveyor, " Liquid Optics...A New Horizon," Vol. 3, #4, Nov. 1967 (350-180)

Primary Examiner—David Schonberg
Assistant Examiner—Paul A. Sacher
Attorneys—Harry M. Saragovitz, Edward J. Kelly, Herbert Berl and Harold W. Hilton

ABSTRACT: A varifocal beam spreader that permits a rapid variation in the beam divergence angle while maintaining a uniform intensity across an illuminated field. The uniform intensity feature is especially significant when used in conjunction with a laser where the Gaussian intensity distribution and the erratic local fluctuations of the laser beam result in nonuniform intensity distribution. Beam divergence can be varied to allow a maximum amount of energy to be concentrated into the area of interest very rapidly. A lenticular plate comprising a series of elongated lenslets forms a series of parallel semicircular tubes. The tubes are filled with a transparent fluid having an index of refraction close to that of the tubes. The plate is placed in the light beam path to spread the beam. Applying pressure to the transparent fluid changes the plate surface, allowing the beam angle to be increased. Similarly, reducing the pressure, reduces the beam angle.

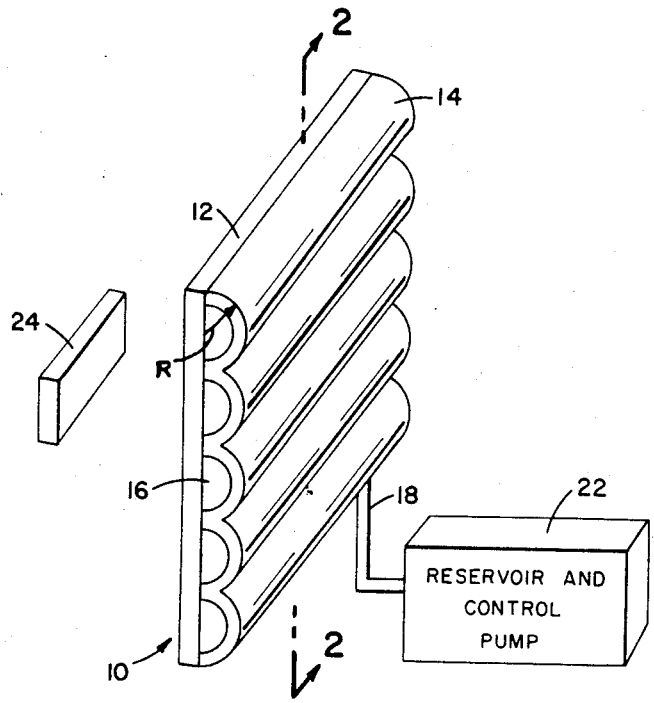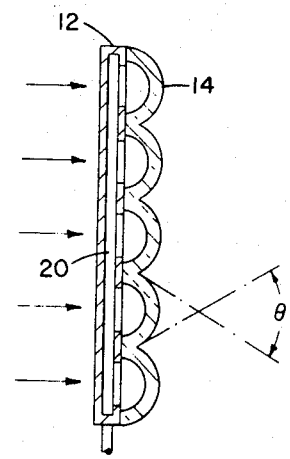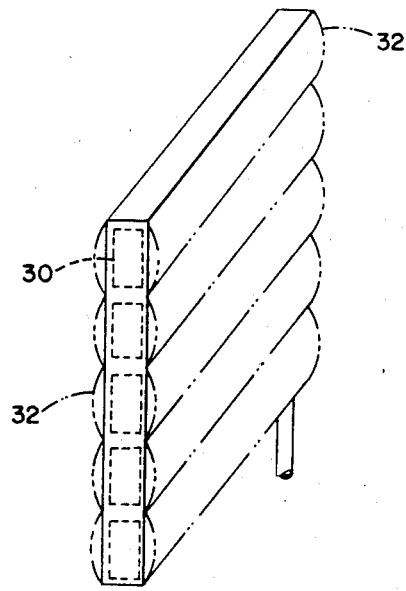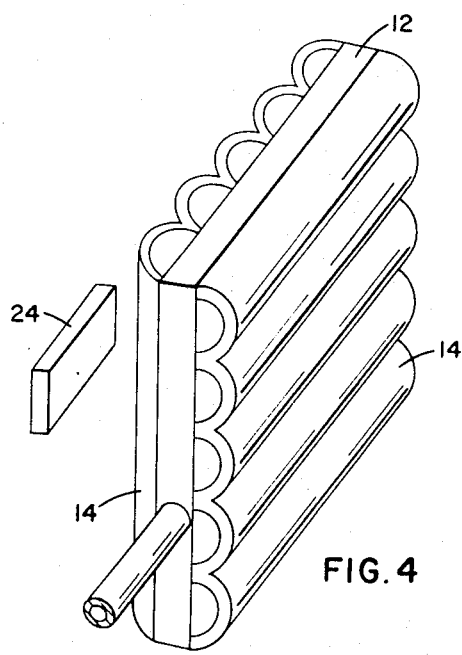
FIG. 1
FIG. 2
FIG. 3
FIG. 4
Thomas R. Bowen,
INVENTOR Thomas R. Bowen,
INVENTOR

3,600,063

VARIFOCAL BEAM SPREADER

DEDICATORY CLAUSE

The invention described herein may be manufactured, used, and licensed by or for the Government for Governmental purposes without the payment to me of any royalty thereon.

SUMMARY OF THE INVENTION

The apparatus of the present invention is a varifocal beam spreader. The beam spreader, lenticular plate, permits rapid and continuous variation of the angle subtended by an illuminated area, and at a fixed range, the area illuminated. Thus, for a fixed power at a fixed range, the illumination level at the illuminated area is readily controllable. Beam divergence can be rapidly varied to allow a maximum amount of energy to be concentrated from a large area into a smaller area of interest. A series of parallel semicircular tubes form a lenticular plate wherein the tubes are filled with a transparent fluid having an index of refraction close to that of the tubes. The plate is placed in a light beam to spread the beam. Applying pressure to the fluid changes the plate surface, thus changing the beam angle projected therethrough. Thus, increasing or decreasing the pressure on the plate increases or decreases the beam angle subtended.

BRIEF DESCRIPTION OF THE DRAWINGS

FIG. 1 is a perspective view of an embodiment of the invention.

FIG. 2 is a section along the line 2–2 of FIG. 1.

FIG. 3 is a perspective view of a double-convex lenticular plate.

FIG. 4 is a perspective view of another embodiment of the invention.

DESCRIPTION OF THE PREFERRED EMBODIMENT

Figure 5:
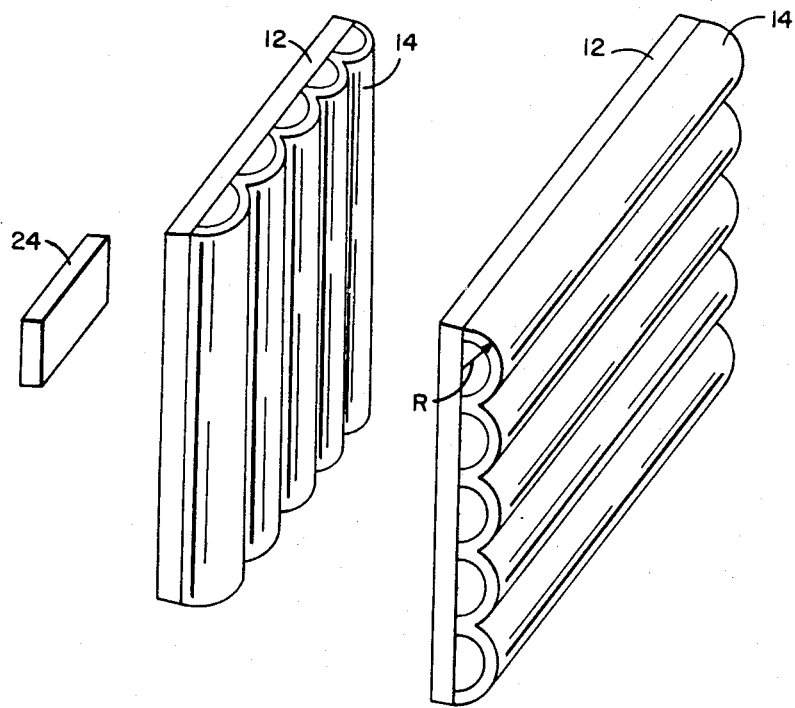
FIG. 5 is a variation of the lenticular plate arrangement of FIG. 3.

Referring now to the drawings wherein like numerals represent like parts in all FIGS., there is disclosed a preferred embodiment of the present invention. As disclosed in FIG. 1, a varifocal beam spreader 10 (lenticular plate) includes a transparent backing plate 12 and a series of transparent, parallel, semicircular tubes 14. Plate 12 may be comprised of either a rigid or elastic material. Semicircular tubes 14 may be cast or molded of an elastic material and the open or flat side thereof sealed to backing plate 12. The ends 16 of tubes 14 are sealed, allowing the tubes to be filled with a transparent fluid having an index of refraction close to that of tubes 14. The fluid is readily supplied through a hose 18 connected at one end to plate 12. Any tube 14 may readily be filled through a manifold chamber 20 (FIG. 2) in plate 12 that opens into the tube. The transparent fluid is supplied from a pressure control source 22 which may be a convenient reservoir and control that is connected to the other end of hose 18. FIG. 2 shows the connection between manifold 20 and the tubes, allowing equal pressure therebetween.

By placing the varifocal beam spreader in the beam path of a light source 24, the beam can be spread and smoothed to provide more uniform illumination. The beam angle $\theta$ (as shown in FIG. 2) is varied by a variation of the fluid pressure within tubes 14. If backing plate 12 is rigid, the beam angle is given by the equation $$\theta = 2\tan^{-1}((n-1)d/2R), \quad (1)$$

$n$=index of refraction of plate 12 and tube 14,
$d$=diameter of outside of one tube 14, and
$R$=radius of outside curvature of tube 14. By increasing the fluid pressure, radius R is effectively decreased and the beam angle $\theta$ is increased. Increasing the fluid pressure causes a corresponding sharper arc on the surface curve of each tube 14. In essence, this shifts the center of a circle, including the arc therein, closer to the circumference thereof. Thus, the arc radius becomes less as pressure increases. Similarly, a decrease of fluid pressure in tubes 14 causes an increase in radius R, resulting in a decreased beam angle $\theta$.

If backing plate 12 is elastic, semicircular tubes 14 and plate 12 can be cast, molded or extruded from a transparent elastic material. They may be produced separately and then joined as in FIG. 1, or they may be molded as one unit. When plate 12 and tube 14 are made of the same elastic material, both sides are free to deform under pressure. One possible embodiment is that of FIG. 3. When tubes 30 are placed under an increased fluid pressure, each tube contours into a double-convex lenslet 32. With both sides deforming equally, beam angle $\theta$ is given by the equation $\theta = \tan^{-1}((n-1)d/R)$. (2) A highly plasticized polyvinylchloride is one of several possible materials that may be used as the transparent elastic material. Equations (1) and (2) are based on the assumption that light passing through the plate 12, from left to right as shown in FIG. 2, is collimated. The light passing through a given tube will be brought through a focal point that defines the angle $\theta$.

As described in FIGS. 1 and 3, the beam spreader will spread the illumination in only one direction (dimension), radiating perpendicular to the face of the arc. For two dimensional spreading, it is necessary to employ two tubes 14 at right angles to each other. This is accomplished by forming two sets of tubes 14 to one solid plate 12 as shown in FIG. 4. Two dimensional spreading may also be accomplished by use of two separate beam spreaders as shown in FIG. 5. However, with the embodiment of FIG. 5, light transmission is reduced. The intensity of light beam transmission is reduced by additional air-to-material interfaces.

By using the varifocal beam spreader, it is possible to select the illuminated shape to be either square, rectangular or circular. The ratio of height to width of the illuminated area is determined by the dimensions of lenticular plate 10. Control of the varifocal beam spreader can be readily adapted for remote control applications. The beam spreader may be employed in any system where it is desired to illuminate an area uniformly. For example, an airborne system where it is desired that an area of terrain be illuminated with radiation of a specific wavelength, such as that from a ruby laser for observation by an electrooptical imaging system. Background and backscatter radiation may be suppressed by using range gating, thus radiation is received only from the target. The light intensity from a ruby laser is highly nonuniform across the beam. Projecting this beam would normally result in a highly nonuniform illumination of the area under consideration. If the beam is spread by a conventional lens system, a poor quality image for observation is produced. However, by using the varifocal beam spreader, it is possible to uniformly illuminate the desired area from whatever range is desired. If some portion of the image merited more detailed consideration, it is simple to concentrate all the illumination is that area by varying the fluid pressure.

Figure 6:
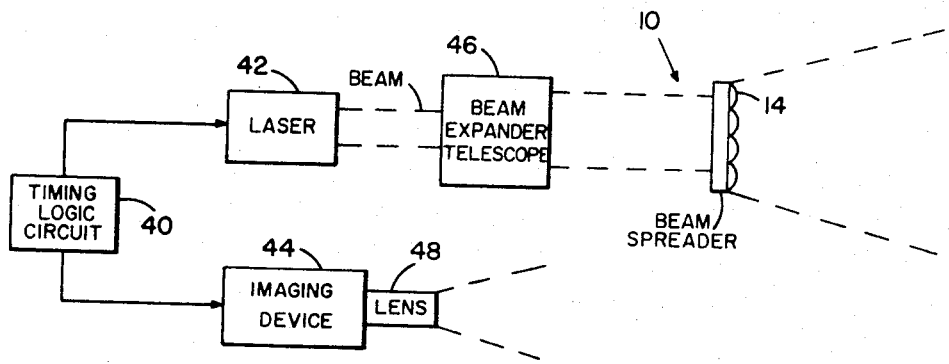
FIG. 6 is a block diagram of an embodiment employing the inventive concept.

A possible system layout is disclosed in FIG. 6, wherein a timing logic circuit 40 controls a laser 42 and a gated electrooptical imaging device 44. The output beam of laser 42 is expanded by a beam expander telescope 46 which may be similar to the inverted-Gallilean or Keplerian design. Telescope 46 spreads the beam over more of the lenslets formed by the intersection of the perpendicular tubes 14 so that the summation of radiation at the target is from a larger number of points, yielding a more uniform illumination. Imaging device 44 is aligned to focus on the same area illuminated by the uniform beam. A zoom lens 48 is on imaging device 44 to allow enlargement of any portion of the illuminated scene which is to be given detailed study. If additional illumination is desired on a portion of the scene, fluid pressure is decreased and the beam angle subtended is reduced, thus concentrating the beam into a smaller area.

Although a particular embodiment and form of this invention has been illustrated, it is obvious to those skilled in the art that modifications may be made without departing from the scope and spirit of the foregoing disclosure. For example, the manifold chamber may be contained in an adjoining section at one end of the tubes. This is appropriate with the embodiment of FIG. 3. For better control in two dimensional spreading, FIGS. 4 and 5, the pressure within each set of tubes 14 may be independently controlled. Thus, a first beam spreader could produce a desired spreading of the beam before it reaches the second beam spreader, with no effect on the second beam spreader control. The adjustable lens can also have circular tubes and project a circular beam. Therefore, it is understood that the invention is limited only by the claims appended thereto.

I claim:

1. A varifocal beam spreader disposed for positioning in the path of a light beam for varying the light beam divergence angle while maintaining a uniform intensity of illumination, comprising: a backing plate having affixed thereto a first adjustable lens means for varying the beam divergence angle for uniform illumination, said first adjustable lens means includes a first plurality of transparent, elastic, substantially parallel tubes secured to said backing plate said tubes being molded as one unit and each tube having a rectangular cross section, said tubes and said backing plate having substantially the same index of refraction; a manifold chamber adjacent to one end of said tubes and connected thereto; a transparent fluid within said tubes and manifold chamber and having an index of refraction close to that of said tubes; and pressure means connected to said manifold chamber for varying the pressure on the fluid therein and within said tubes for providing a double-convex contour across the surface of each of said tubes.

2. A varifocal beam spreader disposed for positioning in the path of a light beam for varying the light beam divergence angle while maintaining a uniform intensity of illumination, comprising: a backing plate having a first adjustable lens means affixed thereto for varying the beam divergence angle for uniform illumination; said first adjustable lens means includes a rigid plate secured to said backing plate and having a manifold chamber therein, a first plurality of semicircular, elastic, substantially parallel tubes having a flat side thereof bonded to a surface of said plate, and a fluid completely filling said tubes and manifold chamber; said tubes, fluid and plate being transparent and having substantially the same index of refraction; pressure means disposed in communication with said lens means for pressurization thereof; and said manifold chamber being connected with said tubes and said pressure means for applying pressure thereby to each of said tubes and said fluid being responsive to said pressure means for the adjustment of said lens means.

3. A beam spreader as set forth in claim 2 and further comprising a second plurality of semicircular tubes having the flat side thereof bonded to the opposite side of said rectangular plate and having the same dimension thereof, said second plurality of tubes having the longitudinal axes thereof perpendicular to and in a plane parallel with the longitudinal axes of said semicircular tubes, and each of said tubes having at least one end thereof corresponding with said manifold chamber for receiving pressure therethrough.

4. A beam spreader as set forth in claim 2 and further comprising a second adjustable lens means disposed between said light source and said first adjustable lens means and including a transparent, rectangular, rigid plate having a manifold chamber along one side thereof, a plurality of transparent, elastic semicircular tubes that are parallel, said tubes having a flat or open side thereof bonded to and of the same dimensions as said rectangular plate, said tubes having at least one end thereof corresponding with said manifold chamber, a transparent fluid within said tubes having an index of refraction close to that of said tubes; an additional hose interconnecting said chamber and said fluid reservoir; additional pressure control means for independently controlling the pressure applied through said additional hose; and wherein said second adjustable means having the longitudinal axes of said tubes perpendicular to and in plane parallel with the longitudinal axes of said first semicircular tubes.

5. A beam spreader as set forth in claim 2 and further comprising a second series of semicircular tubes having the flat or open side thereof bonded to the opposite side of said rectangular plate and having the same dimensions thereof; said second series of tubes having the longitudinal axes thereof perpendicular to and in a plane parallel with the longitudinal axes of said first semicircular tubes; an additional manifold chamber along a second side of said rectangular plate and adjacent to at least one end of each of said second series of tubes; a transparent fluid within said tubes and manifold chamber having an index of refraction close to that of said tubes; and additional pressure means including fluid reservoir, pressure control and hose connected to said manifold chamber for varying the pressure within said second series of tubes independently of said first tubes.